United States Patent
Xu et al.

(10) Patent No.: US 12,081,624 B1
(45) Date of Patent: Sep. 3, 2024

(54) CRYPTOMINING ASSET MANAGEMENT

(71) Applicant: Auradine, Inc., Santa Clara, CA (US)

(72) Inventors: Patrick Xu, Saratoga, CA (US); Liang Li, Cupertino, CA (US); Aditya Batra, Saratoga, CA (US); Sridhar Chirravuri, Sunnyvale, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 18/518,154

(22) Filed: Nov. 22, 2023

Related U.S. Application Data

(60) Provisional application No. 63/529,282, filed on Jul. 27, 2023.

(51) Int. Cl.
| | |
|---|---|
| *H04L 67/141* | (2022.01) |
| *G06F 11/07* | (2006.01) |
| *G06F 11/30* | (2006.01) |
| *H04L 41/08* | (2022.01) |
| *H04L 43/065* | (2022.01) |
| *H04L 43/08* | (2022.01) |
| *G06Q 20/06* | (2012.01) |

(52) U.S. Cl.
CPC ........ *H04L 67/141* (2013.01); *G06F 11/0766* (2013.01); *G06F 11/3065* (2013.01); *H04L 41/08* (2013.01); *H04L 43/065* (2013.01); *H04L 43/08* (2013.01); *G06F 2201/87* (2013.01); *G06Q 20/065* (2013.01)

(58) Field of Classification Search
None
See application file for complete search history.

(56) References Cited

U.S. PATENT DOCUMENTS

| | | | |
|---|---|---|---|
| 7,315,887 B1 * | 1/2008 | Liang | .................. G06Q 10/087 |
| | | | 705/28 |
| 2019/0213046 A1 | 7/2019 | Matus | |
| 2022/0086001 A1 | 3/2022 | Rahn et al. | |
| 2022/0253795 A1 * | 8/2022 | Gersbach | ........... G05B 19/4183 |
| 2023/0362128 A1 | 11/2023 | Eastlake, III | |

FOREIGN PATENT DOCUMENTS

| | | | | |
|---|---|---|---|---|
| WO | WO-2015131524 A1 * | 9/2015 | ............. | H04L 67/02 |

* cited by examiner

*Primary Examiner* — Lance Leonard Barry
(74) *Attorney, Agent, or Firm* — Fish & Richardson P.C.

(57) ABSTRACT

Systems, methods, and apparatus, including programs encoded on computer storage media, for cryptomining asset management. In one aspect, a method performed by an asset management server for a computer network is provided. The method includes: receiving, from a computer, a request to establish a network connection in the computer network; transmitting, to the computer, a response to the request that establishes the network connection with the computer; receiving, from the computer via the network connection, a unique identifier of the computer in the computer network; determining, based on the unique identifier of the computer, whether the computer is an asset associated with the asset management server; and upon determining that the computer is an asset: transmitting, to the computer via the network connection, a set of configurations for the computer, where the set of configurations includes a software configuration that configures the computer to perform a mining operation.

23 Claims, 8 Drawing Sheets

CRYPTOMINING ASSET MANAGEMENT

CROSS-REFERENCE TO RELATED APPLICATIONS

This application claims the benefit of U.S. Patent Application Ser. No. 63/529,282, filed on Jul. 27, 2023. The disclosure of the prior application is considered part of (and is incorporated by reference in) the disclosure of this application.

TECHNICAL FIELD

This disclosure relates generally to computer systems for cryptomining asset management.

BACKGROUND

Cryptomining asset management solutions are typically unavailable to the users of cryptomining assets (e.g., computers that perform computation tasks for mining cryptocurrencies). It typically requires significant and tedious effort to onboard a new asset (e.g., adding and registering the new asset to a computer network of existing assets), configure the assets, and energy tune one or more assets from one central location. Also, it can be a difficult task monitoring the health status of all assets continuously and making decisions to control the assets accordingly. Also, it can be difficult to notify users of any failures in large-scale systems, prepare a failure report in the required format, and use the failure report for analysis to prevent any future issues. Hence, there is a need for systems, methods, and apparatus for improved cryptomining asset management solutions.

SUMMARY

The present disclosure describes a cryptomining asset management system implemented as computer programs on an asset management server for managing multiple cryptomining assets in a cryptomining computer network.

The asset management server, sometimes referred to as a Fleet Management Console (FMC), can be a dedicated hardware device or data center in a central location, or a cloud server dispersed over one or more locations. The server is configured to transmit and receive data to and from the assets in the computer network, that may be housed in multiple different data centers, to perform individual or group-based asset control. For example, the server can control an individual asset or a group of assets based on several factors such as performance metrics (e.g., hash rate and power consumption), current parameters of a cryptocurrency (e.g., current price, difficulty, and block subsidy), energy rate of a server provider, and/or input from a user that owns the individual asset or group of assets. In general, the asset management server can manage any number of assets, e.g., one thousand, ten thousand, one hundred thousand, one million, or more assets.

As used herein, a cryptomining asset refers to any computer, miner, or electronic circuit that is configured to perform a mining operation, e.g., a cryptocurrency mining operation. In some examples, each asset includes multiple integrated circuit (IC) chips, e.g., application-specific integrated circuits (ASICs), that can efficiently perform tasks related to the mining operation, particularly hashing operations. The asset can also include a computer processing unit (CPU) for providing instructions to the IC chips to perform the hashing operations, as well as for performing other tasks related to the mining operation, e.g., arithmetic and logic operations. The asset may include additional circuitry such as an oscillator to synchronize the IC chips with a clock signal.

In general, the asset management server and its associated assets are implemented as a cryptomining computer network, e.g., a wide area network (WAN), a radio area network (RAN), a metropolitan area network (MAN), a campus area network (CAN), a local area network (LAN), or a wireless local area network (WLAN).

In most cases, the computer network is a WAN that allows assets to connect to the network over large scale distances, e.g., in multiple different data centers across a country or multiple countries. This allows a group of assets pertaining to a particular user (e.g., a customer or owner of the group of assets) to be made visible to the user anywhere in the world, e.g., over the internet. For example, the user can interact with a user interface that communicates with the asset management server via an application programming interface (API). However, the computer network can also be a smaller-scale network such as a LAN allowing, for example, a single owner of the server and assets to manage their assets automatically and securely using the server.

Each asset is assigned a unique identifier (UID) for individually identifying and controlling the asset in the computer network. For example, the UID can be a serial number assigned by a central authority, an accepted reference, or a manufacturer of the asset. Each UID can be recorded in a catalog that is maintained, e.g., by the manufacturer, that provides a list of all assets and their respective device specifications that have been deployed and are associated with the asset management server. The asset management server can cross-index the catalog to determine which assets are, or are not, currently connected to the computer network and validate any new assets connected to the network.

Particularly, the asset management server retains a registry that includes UIDs of each asset that has been validated and is currently connected to the computer network. The registry may also include any old assets that that been disconnected from the network, e.g., after their lifecycle and/or going out of service. For example, the registry can be a list of assets associated with a domain name (e.g., for a WAN) or a hostname (e.g., for a LAN) assigned to the asset management server. When a new asset is connected to the computer network, the asset management server can establish a network connection with the new asset, validate the new asset's UID with the catalog, add it to the registry, and maintain the network connection with the new asset to push control and configuration information to the new asset. Particularly, upon validation, the server is programmed to automatically transmit a set of configurations to the new asset via the network connection. Generally, the set of configurations includes a software configuration that configures the new asset to perform a mining operation. Hence, the asset management server provides a means of zero-touch provisioning (ZTP) cryptomining assets which can greatly increase the efficiency of asset onboarding and registration.

Each asset can be assigned a network address when it is connected to the computer network, e.g., an Internet Protocol (IP) address dynamically generated and assigned to the asset by the server (or a network provider) using a Dynamic Host Configuration Protocol (DHCP). The server can use a network address as another UID of an asset as well as other information pertaining to the network address, e.g., geolocation, current network configuration of the asset, and other information that may be provided by the network provider.

In some cases, assets in the computer network may identify and communicate with one another using the network addresses. The asset management server and cryptomining assets can communicate securely in the computer network via network messages using an appropriate communication protocol, e.g., WebSocket, HTTPS, among others.

The asset management server can further include (or instantiate) a pooling server (e.g., a proxy server or connection pooler) to pool network connections for a pool of assets. Particularly, the asset management server can assign a new asset to a pool of assets that are pooling network connections with a particular pooling server. For example, the asset management server can use information such as the geolocation of the new asset, the serial number of the new asset, the network address of the new asset, the hardware specifications of the new asset, and/or the operating system of the new asset to assign the new asset to the pool of assets. The new asset can then receive a set of pool configurations from the asset management server, via the pooling server, that automatically configures the new asset to perform a mining operation. This allows the server to onboard and configure many new assets that have common features with one another, further improving the speed and efficiency of ZTP. Moreover, the asset management server can periodically broadcast pool configurations to all assets belonging to the asset pool such that all assets in the pool are in sync with the latest pool configurations.

The asset management server can maintain a list of pooling servers that includes their respective server names, network addresses, and pool configurations. The asset management server can further poll each pooling server to check the status and/or receive periodic status updates from the pooling servers. If a pooling server becomes unavailable (e.g., loses network connection), the asset management server can automatically select (e.g., based on network latency, congestion, server load, task priority, or user's setting) a backup pooling server. The asset management server can then transfer all assets belonging to the unavailable pool server to the backup pooling server. For example, the asset management server can broadcast a network message to all affected assets to instruct those affected assets to use the pool configurations of the backup pooling server.

A user of the asset management system can define their own pool configurations and upload the pool configurations to the asset management server. Alternatively, or in addition, the server can maintain default pool configurations (e.g., programmed by an administrator of the server) that are made available to any new assets. As such, the asset management server reduces human intervention in the onboarding process of a cryptomining asset while allowing for flexibility and robustness.

Besides these abovementioned methods of ZTP of new assets, the asset management server can further configure new assets in multiple additional ways. The asset management server can also control new assets and other assets associated with the server in multiple different ways, including one or more of the following:

Group Management: grouping multiple assets by their geolocation, their hardware specifications, a common owner of the asset; controlling a group's visibility and accessibility to users or other servers; and controlling the operation details of groups of assets, both at high and low levels.

Performance Management: configuring energy tune (e.g., automatically or manually increasing or decreasing the power consumption of an asset); configuring power consumption constraints (e.g., maximum or minimum power consumption for an asset to operate at based on hardware specification or service provider constraints); ramping up and/or down of assets under any critical conditions such as power surges; and pool configuring (e.g., pooling network connections of assets with a pooling server and pushing a common set of pool configurations to the pooled assets, e.g., for performing a certain mining operation).

Software and/or Firmware Upgrade: providing TeraHashRate settings to all or selected assets; firmware upgrade of all or selected assets; and network configurations for network connections (e.g., WebSocket or HTTPS parameter configurations) to all or selected assets.

Asset Monitoring and Reporting: tracking real time health status information of assets; recording alerts of asset faults or failures; generating standard formatted reports (e.g., PDF, CSV, etc.); and forwarding the reports to an administer of the asset management server for analysis and/or investigation.

Coordinating with other user devices via secured API: sharing the asset management information (e.g., health status information of a user's assets) from the server to other platforms, such as other cloud servers, mobile devices of users, etc.

These and other features related to the asset management server are summarized below.

In general, according to a first aspect, a method performed by an asset management server for a computer network is provided.

The method includes: receiving, from a computer, a request to establish a network connection in the computer network; transmitting, to the computer, a response to the request that establishes the network connection with the computer; receiving, from the computer via the network connection, a unique identifier of the computer in the computer network; determining, based on the unique identifier of the computer, whether the computer is an asset associated with the asset management server; and upon determining that the computer is an asset associated with the asset management server: transmitting, to the computer via the network connection, a set of configurations for the computer, where the set of configurations includes a software configuration that configures the computer to perform a mining operation.

In some implementations of the method, determining, based on the unique identifier of the computer, whether the computer is an asset associated with the asset management server includes: obtaining a catalog including a respective unique identifier of each asset associated with the asset management server; and determining whether the unique identifier of the computer is amongst the unique identifiers in the catalog. For example, the catalog can be obtained from a manufacturer of each asset associated with the asset management server.

In some implementations, the method further includes, upon determining that the computer is an asset associated with the asset management server updating, with the unique identifier of the computer, a registry including a respective unique identifier of each asset associated with the asset management server that is connected to the computer network. For example, the unique identifier of the computer can be a serial number of the computer. The method can further include: generating a network address for the computer when establishing the network connection with the computer; and upon determining that the computer is an asset associated with the asset management server: updating the registry with the network address for the computer.

In some implementations, the method further includes, upon determining that the computer is not an asset associated with the asset management server: terminating the network connection with the computer.

In some implementations, the method further includes, upon determining that the computer is an asset associated with the asset management server: monitoring health status information of the computer while performing the mining operation; generating a report including the health status information of the computer; and providing the report to an administrator of the asset management server. For example, the health status information of the computer can include one or more of: any faults or failures of the computer while performing the mining operation; a temperature of the computer while performing the mining operation; or a memory usage of the computer while performing the mining operation.

In some implementations of the method, the set of configurations further includes: a network configuration that configures the network connection with the computer.

In some implementations, the method further includes, upon determining that the computer is an asset associated with the asset management server: transmitting, to the computer via the network connection, a software update that updates the software configuration for the computer.

In some implementations of the method, the network connection with the computer is established via a pooling server, and the set of configurations for the computer is a set of pool configurations for each asset associated with the asset management server that is connected to the computer network via the pooling server.

In some implementations of the method, the set of configurations further includes: an operating configuration that configures operating parameters of the computer while performing the mining operation. For example, the operating parameters of the computer can include one or more of: a maximum power consumption of the computer while performing the mining operation; a minimum power consumption of the computer while performing the mining operation; or a target hash rate of the computer while performing the mining operation.

In some implementations of the method, the mining operation is a cryptocurrency mining operation for a cryptocurrency. The method can further include, upon determining that the computer is an asset associated with the asset management server: retrieving, from a service provider servicing the computer, an energy rate while the computer is performing the cryptocurrency mining operation; retrieving, from a market of the cryptocurrency, parameters of the cryptocurrency while the computer is performing the cryptocurrency mining operation; and determining, from the energy rate and the parameters of the cryptocurrency, the target hash rate that maximizes a rate of return for the cryptocurrency mining operation. For example, the parameters of the cryptocurrency can include one or more of: a price of the cryptocurrency while the computer is performing the cryptocurrency mining operation; a difficulty of the cryptocurrency while the computer is performing the cryptocurrency mining operation; or a block subsidy of the cryptocurrency while the computer is performing the cryptocurrency mining operation.

In some implementations, the method further includes, upon determining that the computer is an asset associated with the asset management server: grouping, based on common features of the computer and one or more other assets associated with the asset management server that are connected to the computer network, the computer and the one or more other assets into a group of assets; and transmitting, to the computer via the network connection, a set of group configurations for each asset in the group of assets. For example, the common features can include one or more of: a common geolocation of each asset in the group of assets; a common hardware specification of each asset in the group of assets; or a common owner of each asset in the group of assets.

In some implementations of the method, the computer includes: multiple integrated circuit (IC) chips that are series connected using multiple buses; and a central processing unit (CPU) that is configured to transmit control instructions to the IC chips on one or more of the buses.

According to a second aspect, a system including one or more computers and one or more storage devices communicatively coupled to the one or more computers is described. The one or more storage devices store instructions that, when executed by the one or more computers, cause the one or more computers to perform operations of any of the abovementioned methods.

In some implementations, the system is the asset management server.

According to a third aspect, a system including one or more non-transitory computer storage media is described. The one or more non-transitory computer storage media store instructions that, when executed by one or more computers, cause the one or more computers to perform operations of any of the abovementioned methods.

In some implementations, the asset management server includes the one or more non-transitory computer storage media.

In some implementations, the asset management server further includes the one or more computers.

The novel features described above and in the following sections of this specification provide an efficient means of onboarding and registering new cryptomining assets in a cryptomining computer network using an asset management server that is programmed for zero-touch provisioning (ZTP). This can be made even more effective when the asset management server includes (or instantiates) one or more pooling servers that can pool network connections for one or more pools of assets. The server can provide respective sets of pool configurations to the one or more asset pools automatically, improving the performance of ZTP further. The asset management server also provides a means of grouping assets, optimizing performance and/or rate of return of an asset or group of assets performing a mining operation, automatically updating software and/or firmware of assets, monitoring and reporting health status information of assets, coordinating with user devices and other platforms via secure application programming interfaces (APIs), among others.

The details of one or more disclosed implementations are set forth in the accompanying drawings and the description below. Other features, aspects, and advantages will become apparent from the description, the drawings, and the claims.

DETAILED DESCRIPTION

Figure 1A:
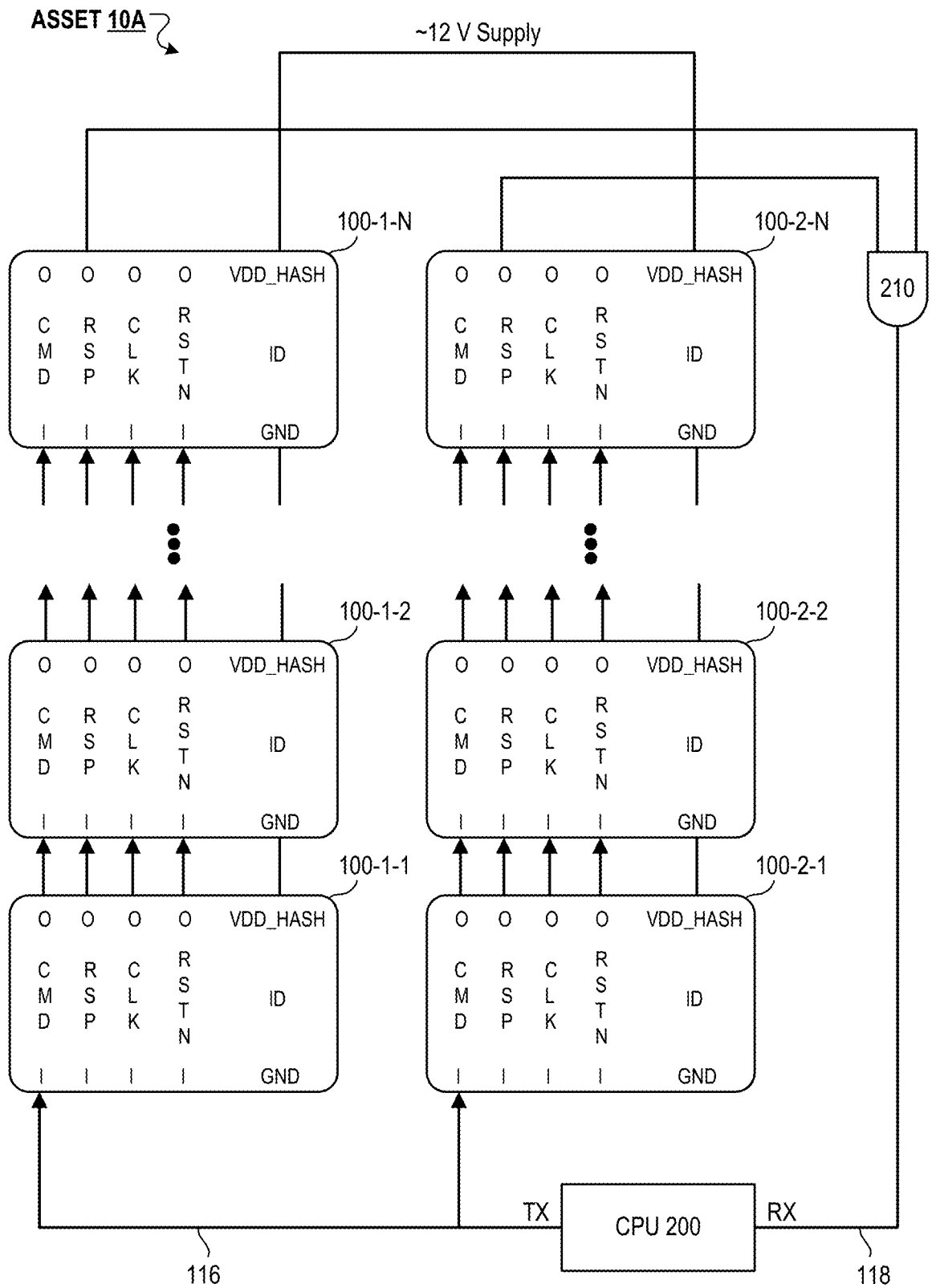
FIGS. 1A-1C show schematic diagrams of example cryptomining assets.

FIGS. 1A-IC show different examples of cryptomining assets 10 that can be managed by an asset management server in a cryptomining computer network. As used herein, an asset 10 can refer to a computer, a miner (e.g., a cryptocurrency miner), or a general electronic circuit that is configured to perform a mining operation.

FIG. 1A shows a schematic diagram of an example asset 10A. Asset 10A includes multiple integrated circuit (IC) chips 100, a CPU 200, and an AND gate 210. IC chips 100-1-1 through 100-1-N are connected in series and form a daisy chain by coupling output terminals of one IC chip 100-$n$ to input terminals of a downstream neighboring IC chip 100-($n$+1) and coupling input terminals of the IC chip 100-$n$ to output terminals of an upstream neighboring IC chip 100-($n$−1). Similarly, IC chips 100-2-1 through 100-2-N are connected in series and form another daisy chain. Note that asset 10A in FIG. 1A is shown to include two daisy chains for illustrative purposes only. In general, asset 10A can include any suitable number of IC chips 100 (e.g., on the order of tens, hundreds, thousands, or more IC chips 100) arranged in any suitable number of daisy chains, e.g., one, two, five, ten, twenty, one hundred, or more daisy chains.

Each IC chip 100 is generally an application-specific integrated circuit (ASIC) configured to efficiently perform tasks relating to mining operations. In this example, asset 10A includes a command (CMD) bus 116 and a response (RSP) bus 118. Asset 10A can also include a clock (CLK) bus, a reset (RESTN) bus, and a thermal trip (TMTP) bus (see FIG. 1C for example). Each IC chip 100 includes a pair of input and output terminals that can be coupled to a respective bus of asset 10A. In this example, each IC chip 100 has a pair of input 116-I and output 116-O terminals coupled to the command bus 116, and a pair of input 118-I and output 118-O terminals coupled to the response bus 118.

In some implementations, each IC chip 100 has an odd or even configuration in an ordered arrangement of IC chips 100-1-1 through 100-2-N. For example, assuming N is an even number, IC chips 100-1-1, 100-1-3, . . . , 100-1-(N−1), 100-2-1, 100-2-3, . . . , and 100-2-(N−1) can have even configurations, and IC chips 100-1-2, 100-1-4, . . . , 100-2-N, 100-2-2, 100-2-4, . . . , and 100-2-N can have odd configurations.

Asset 10A is configured to perform cryptographic mining operations, e.g., a blockchain mining process, using the IC chips 100. Hence, the asset 10A can be deployed as a computational node in a cryptomining computer network for applications that rely on blockchain mining, e.g., for cryptocurrency mining, maintaining linked records of digital transactions, etc. In this context, a blockchain is a decentralized and distributed digital ledger that records units of information, e.g., transactions, across multiple computers or nodes. In a blockchain, transactions are grouped into blocks and added to a chain of previous blocks, forming a chronological sequence. Each block includes a hash value and a reference to the previous block, creating a linked structure. The blocks in the same blockchain are linked by having their hash values inserted into a designated field, e.g., a block header, in the next sequential block in the blockchain. A process of blockchain mining is designed to allow a blockchain system to reach a consensus in which all computational nodes in the blockchain system agree to a same blockchain. An example mining process by a computational node of a blockchain system can include computing a valid proof-of-work for a block candidate that will be added to a blockchain. The proof-of-work for a block can include a nonce value that, when inserted into a designated field of the block, makes the cryptographic hash value of the block meet, e.g., equal to or less than, a certain difficulty target set by the system.

IC chips 100 are configured (or customized) to perform computations instructed by CPU 200. Each chip 100 can receive an input signal from CPU 200 instructing IC chips 100 to perform computations for a particular task. After receiving the input signal, each IC chip 100 can perform the computations indicated by the input signal and transmit an output signal to CPU 200.

CPU 200 is configured to carry out arithmetic and logic operations, data manipulations, and control flow management in accordance with operations of asset 10A. For example, CPU 200 can include components such as a control unit, an arithmetic logic unit, one or more registers, and one or more caches, etc. The control unit of CPU 200 manages the flow of data between different components of CPU 200, and can be configured to fetch instructions from a memory, decode the instructions, and coordinate execution of the instructions. The arithmetic logic unit can be configured to perform arithmetic operations (e.g., addition, subtraction, multiplication, and division), and logical operations (e.g., AND, OR, and NOT) on data. The registers of CPU 200 can be configured to store temporary data, instructions, and intermediate results during processing. The registers can also include a program counter which keeps track of the address of the next instruction to be executed, and general-purpose registers for storing data. The caches of CPU 200 can be configured to temporarily store frequently accessed data and instructions.

CPU 200 can be configured to transmit an input signal on command bus 116. The input signal can reach IC chips 100-1-1 and 100-2-1, and can be forwarded to the next IC chips 100-1-2 and 100-2-2 in the respective daisy chain.

AND gate 210 is a circuit or a device that performs a logical conjunction operation. For example, AND gate 210 can output a logic high signal (e.g., "1") when all of its input signals are logic high signals. If any of the input signals is a logic low signal (e.g., "0"), AND gate 210 can output a logic low signal. In the shown example, AND gate 210 is configured to perform a logical conjunction operation based on response output signals from IC chips 100-1-N and 100-2-N, and transmit an operation result to CPU 200 on response bus 118.

Note that asset 10A is shown to include one AND gate 210 for illustrative purposes only. Asset 10A can include more than one AND gate 210, for example, when asset 10A includes more than two daisy chains. In this case, multiple AND gates 210 can be linked and cascaded to perform logical conjunction operations based on response output signals from the daisy chains.

An example operating process of asset 10A includes CPU 200 sending a signal on command bus 116 to IC chips 100. The signal can indicate a command to perform a particular task. Each IC chip 100 receives the signal on command bus 116, performs one or more computations corresponding to the particular task, produces one or more computation results, and transmits the computation results on response bus 118. Each IC chip 100 can combine its own computation results with an input signal on response bus 118 from an upstream neighboring IC chip 100 to generate a combined signal, and transmits the combined signal as an output signal on response bus 118 to a downstream neighboring IC chip 100. Output signals from chips 100-1-N and 100-2-N are combined by using AND gate 210 to generate a combined signal, which is then transmitted on response bus 118 to CPU 200.

As an example of a mining process, CPU 200 can send a signal on command bus 116 to IC chips 100, where the signal indicates a command to perform hash computations to find a nonce for a current block header that makes a hash of the block header meet a difficulty target. Each IC chip 100 performs the hash computations in response to the signal. Particularly, each IC chip 100 can randomly choose a nonce and insert the nonce to the current block header, and generate a new block header hash. If the new block header hash is less than or equal to that indicated by the difficulty target, the IC chip 100 can generate a computation result based on the nonce. This process can be repeated until an IC chip 100 finds a nonce that produces a hash that is less than or equal to that indicated by the difficulty target.

When one of the IC chips 100 obtains a nonce that makes the new block header hash meet the difficulty target, the IC chip 100 can generate a data signal indicating the nonce. The data signal is a series of bits in a pattern that indicates a value of the nonce. When one of the IC chips 100 does not obtain a nonce that makes the new block header hash meet the difficulty target, the IC chip 100 can generate an idle signal or stay quiet. The idle signal is a series of bits in a known pattern, e.g., a known number of "0"s or "1"s that indicates idle or not hit. When one of the IC chips 100 receives an input signal on response bus 118 from an upstream neighboring chip in a same daisy chain, the IC chip 100 can combine its own signal (e.g., the data signal or idle signal) and the input signal to generate a combined signal, and transmit the combined signal as an output signal on response bus 118.

By using the above combine-and-forward method, the output signal of an IC chip 100 can be promptly transmitted without undergoing synchronization or retiming processes. In doing so, the asset 10A avoids store-and-forward mechanism for data, which minimizes delays typically incurred during such processes. The combining and forwarding of the signals enable swift transmission without latency-inducing operations.

In the shown example of FIG. 1A, the command and response terminals of IC chips 100 are routed in a same direction on command bus 116 and response bus 118. For example, the command terminals of IC chips 100-1-1 through 100-1-N are connected such that a signal transmission direction on command bus 116 is from IC chip 100-1-1 to IC chip 100-1-N. The response terminals of IC chips 100-1-1 through 100-1-N are connected such that a signal transmission direction on response bus 118 is also from IC chip 100-1-1 to IC chip 100-1-N. Similarly, the command terminals of IC chips 100-2-1 through 100-2-N are connected such that a signal transmission direction on command bus 116 is from IC chip 100-2-1 to IC chip 100-2-N. The response terminals of IC chips 100-2-1 through 100-2-N are connected such that a signal transmission direction on response bus 118 is also from chip IC chip 100-2-1 to IC chip 100-2-N.

Figure 1B:
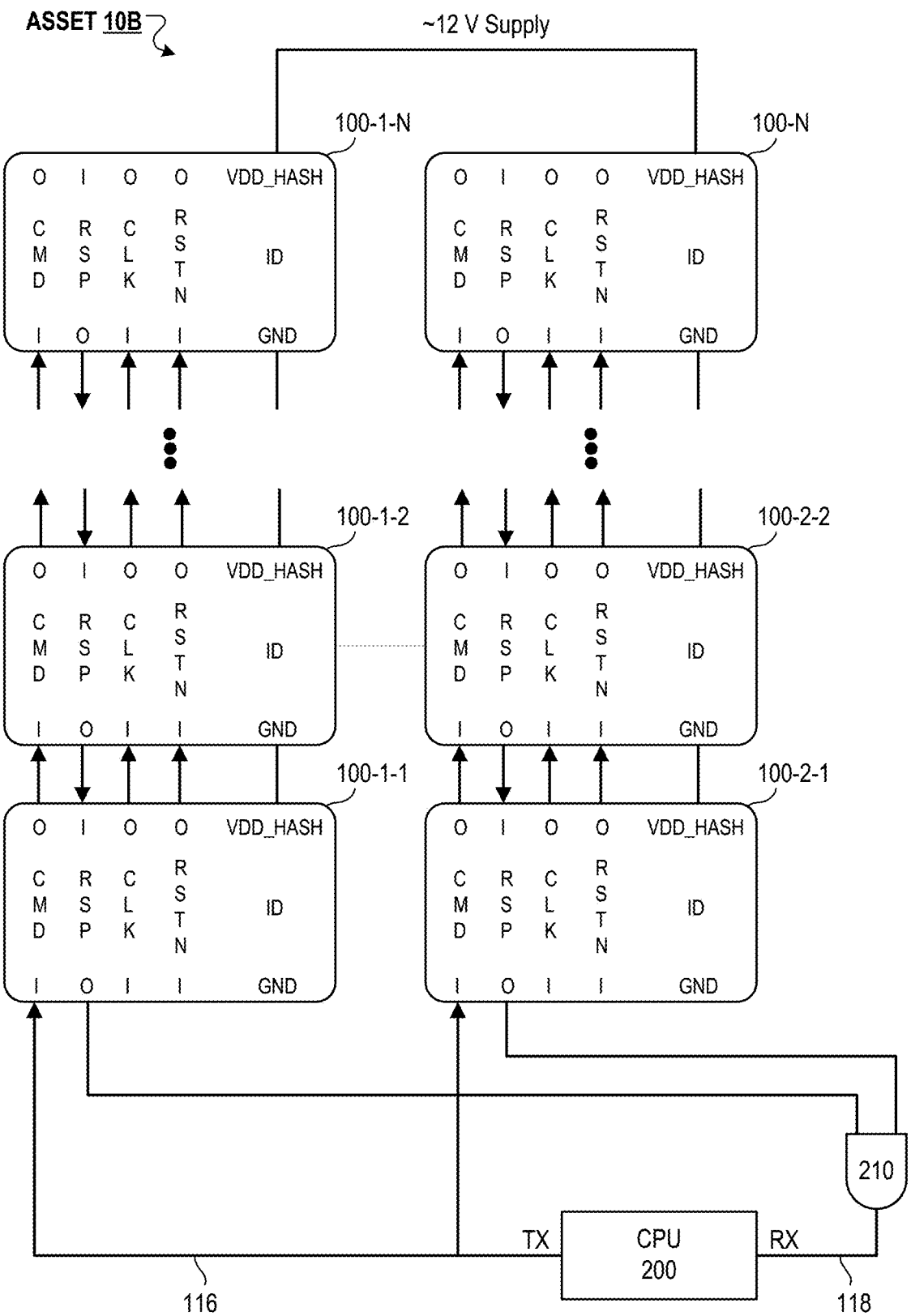

FIG. 1B shows a schematic diagram of another example asset 10B configured similarly to the example asset 10A in FIG. 1A. However, in the shown example of FIG. 1B, the command terminals and the response terminals of IC chips 100 are routed in different directions on command bus 116 and response bus 118. Particularly, the command terminals of IC chips 100-1-1 through 100-1-N are connected such that a signal transmission direction on command bus 116 is from IC chip 100-1-1 to IC chip 100-1-N. The response terminals of IC chips 100-1-1 through 100-1-N are connected such that a signal transmission direction on response bus 118 is from IC chip 100-1-N to IC chip 100-1-1. Similarly, the command terminals of IC chips 100-2-1 through 100-2-N are connected such that a signal transmission direction on command bus 116 is from IC chip 100-2-1 to IC chip 100-2-N. The response terminals of IC chips 100-2-1 through 100-2-N are connected such that a signal transmission direction on response bus 118 is from IC chip 100-2-N to chip 100-2-1.

In some implementations, each IC chip 100 has an odd or even configuration in an ordered arrangement of IC chips 100-1-1 to 100-2-N. For example, assuming N is an even number, each IC chip 100 can have different odd or even configurations with respect to command bus 116 and response bus 118. IC chips 100-1-1, 100-1-3, . . . , 100-1-(N−1), 100-2-1, 100-2-3, . . . , and 100-2-(N−1) can have even and odd configurations with respect to signal transmissions on the command 116 and response 118 buses, respectively. Conversely, IC chips 100-1-2, 100-1-4, . . . , 100-2-N, 100-2-2, 100-2-4, . . . , and 100-2-N can have odd and even configurations with respect to signal transmission on the command 116 and response 118 buses, respectively.

Figure 1C:
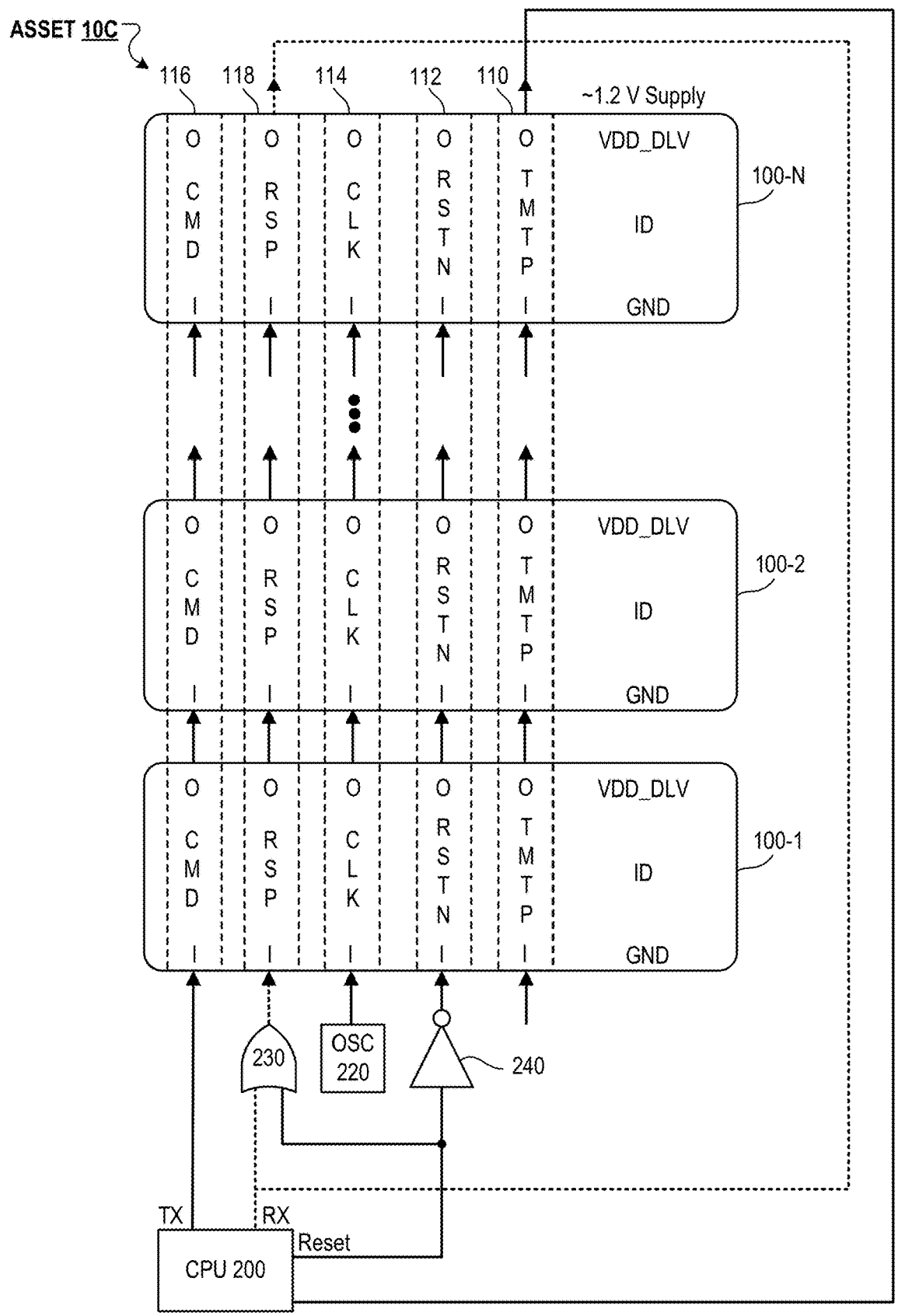

FIG. 1C shows a schematic diagram of another example asset 10C. As shown, asset 10C includes IC chips 100-1 through 100-N, CPU 200, and an oscillator (OSC) 220. IC chips 100 are series connected into a daisy chain using multiple buses including a thermal trip (TMTP) bus 110, a response (RSP) bus 118, a clock (CLK) bus 114, a command (CMD) bus 116, and a reset (RSTN) bus 112. Note that asset 10C is shown to include a single daisy chain for illustrative purposes only. Asset 10C can include any suitable number of IC chips 100 (e.g., in the order of tens, hundreds, or thousands of IC chips 100) arranged in any suitable number of daisy chains, e.g., one, two, five, ten, twenty, one hundred, or more daisy chains.

IC chips 100 are communicatively coupled to CPU 200 on command 116 and response 118 buses. As shown in FIG. 1C, a transmitting terminal of CPU 200 is coupled to a command input 116-I terminal of IC chip 100-1, and a receiving terminal of CPU 200 is coupled to a response output 118-O terminal of IC chip 100-N.

IC chips 100 are communicatively coupled to oscillator 220 on clock bus 114. Oscillator 220 is configured to generate clock signals or timing reference to synchronize the timing of various digital circuits and operations within asset 10C.

Asset 10C further includes an inverter 240. As shown in FIG. 1C, an output terminal of inverter 240 is coupled to a reset input terminal 112-I of IC chip 110-1. Inverter 240 is configured to invert a reset signal and transmit the inverted reset signal to IC chip 100-1.

Asset 10C further includes an OR gate 230. As shown in FIG. 1C, a first input terminal of OR gate 230 is coupled to a response output terminal 118-O of IC chip 100-N, and a second input terminal of OR gate 230 is coupled to a reset signal source. An output terminal of OR gate 230 is coupled to a response input terminal 118-I of IC chip 100-1. OR gate 230 is configured to perform a logical OR operation on its input signals. In some examples, OR gate 230 can accept two input signals and produce a single output signal based on the logical OR operation. The output signal can be a logic high signal (e.g., "1") if at least one of the input signals is high. If all input signals are logic low signals (e.g., "0"), the output signal can be low as well. An output signal on response bus 118 from IC chip 100-N is routed back to IC chip 100-1 via OR gate 230. OR gate 230 is configured to reset an input signal to IC chip 100-1 based on a reset signal from a reset signal source.

An example operating process of asset 10C includes CPU 200 sending a signal on command bus 116 to IC chips 100. The signal can indicate a command to perform a particular task. Each IC chip 100-1 to 100-N can receive the signal on command bus 116, perform one or more computations, produce one or more computation results, and send the computation results on response bus 118. When one of the IC chips 100 receives the signal on command bus 116, the IC chip 100 can determine whether it has data for transmission on response bus 118. If the IC chip 100 determines that it has data for transmission on response bus 118, the IC chip 100 can access response bus 118, and determine whether response bus 118 is in an idle state or a busy state. If the IC chip 100 determines that response bus 118 has been in a first logic state (e.g., a logic high state such as "1") for a known amount of time following accessing response bus 118, the IC chip 100 determines that response bus 118 is in the idle state. When the IC chip 100 determines that response bus 118 is in the idle state, the IC chip 100 can block communication from upstream chips on response bus 118, and transmit its data on response bus 118. For example, if IC chip 100-$n$ determines that response bus 118 is in the idle state, IC chip 100-$n$ can block communication from IC chips 100-($n$+1) and 100-($n$−1). An IC chip 100 can block communication from upstream IC chips for a known amount of time, which can be determined based on one or more of a size of the data, a number of IC chips in asset 10C, or a propagation delay for signal transmission on response bus 118. The IC chip 100 can block communication from the upstream IC chips until completion of transmission of its data on response bus 118.

An IC chip 100 can determine that response bus 118 is in a busy state upon accessing response bus 118. The IC chip 100 can access response bus 118 for a known amount of time. If the chip determines that response bus 118 is in a second logic state (e.g., a logic low state as "0") at one or more time instants during the known amount of time, the IC chip 100 can determine that response bus 118 is in the busy state. In response to determining that response bus 118 is in the busy state, the IC chip 100 can delay transmitting its data on response bus 118 to avoid collision on response bus 118. The IC chip 100 can determine a delay period based on a characteristic of the IC chip 100, and delay transmitting the data on response bus 118 for the determined delay period. In some examples, the characteristic of the IC chip 100 can include a chip identification (ID) number of the IC chip 100. Upon expiry of the delay period, the IC chip 100 can access response bus 118, and determine whether response bus 118 is in an idle state or a busy state. If response bus 118 is in the idle state, the IC chip 100 can block communication from upstream chips on response bus 118, and transmit its data on response bus 118.

As described herein, FIG. 1C introduces a novel communication bus architecture that employs a loop configuration. The final output of the last IC chip 100-N connects to the input of the first IC chip 100-1, forming a continuous loop. This looping arrangement offers several benefits, including increased efficiency and fault tolerance. To ensure proper system operation during reset, an OR gate 230 is strategically incorporated to break the loop temporarily. This mechanism provides flexibility for system initialization and reconfiguration.

Moreover, the looped nature of the communication channels empowers each IC chip 100 within the system with the ability to discern the transmission status of other IC chips 100. Through this intelligent feature, every IC chip 100 becomes aware of ongoing transmissions by its counterparts. When an IC chip 100 detects that another IC chip 100 is actively transmitting data, it acts prudently by deferring its own communication. This proactive approach prevents collisions, ensuring smooth and uninterrupted data flow.

Furthermore, when an IC chip 100 initiates its transmission, it blocks communications from the upstream IC chips 100 in the loop. This deliberate blocking step safeguards against the propagation of the current transmission indefinitely within the loop. By strategically implementing blocking mechanisms, such as logical gates or time-based protocols, the IC chip 100 effectively manages the flow of information and prevents any potential data repetition issues.

To guarantee the integrity of the transmitted signals, an important consideration is accounting for the time-of-flight (ToF), the time taken for signals to propagate through the communication channels. To address this, the IC chips 100 in the asset 10C can implement appropriate blocking periods that encompass the expected time-of-flight. By temporarily blocking communications from the upstream IC chips 100 for the calculated duration, the IC chips 100 ensure that the arriving signals align with the expected timing, which preserves signal integrity and minimizes potential synchronization issues.

Figure 2:
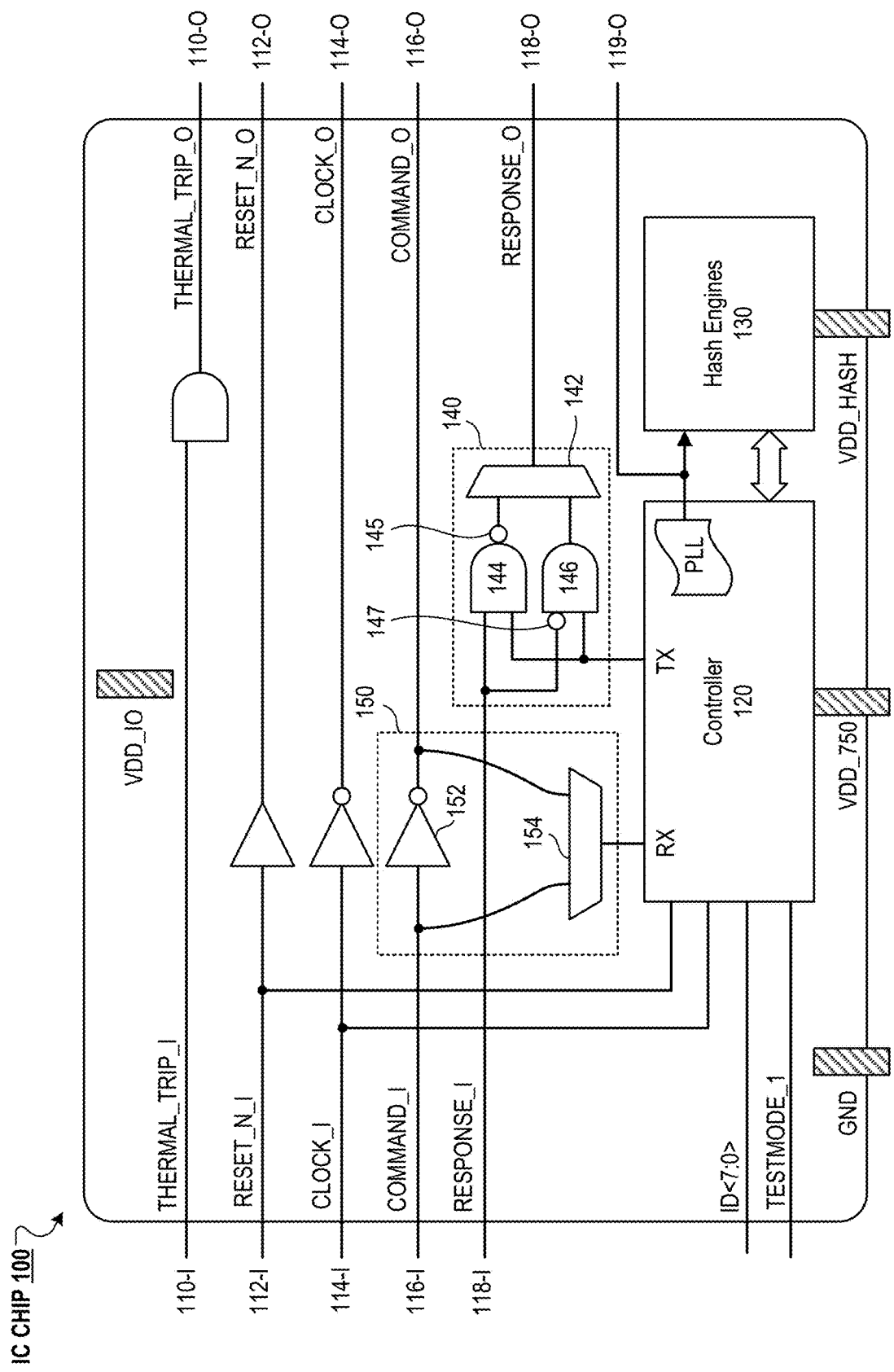
FIG. 2 shows a schematic diagram of an example integrated circuit (IC) chip.

FIG. 2 shows a schematic diagram of an integrated circuit (IC) chip 100. As shown, IC chip 100 includes multiple pairs of input and output terminals coupled to multiple buses. Particularly, IC chip 100 includes input terminal 118-I and output terminal 118-O coupled to a response (RSP) bus 118, input terminal 116-I and output terminal 116-O coupled to a command (CMD) bus 116, input terminal 114-I and output terminal 114-O coupled to a clock (CLK) bus 114, input terminal 112-I and output terminal 112-O coupled to a reset (RSTN) bus 112, and input terminal 110-I and output terminal 110-O coupled to a thermal trip (TMTP) bus 110.

IC chip 100 further includes a circuit 140 for processing signals on the response bus 118. Circuit 140 is configured to receive an input signal at input terminal 118-I on the response bus 118, combine the input signal with a signal sent by controller 120 to generate a combined signal, and transmit the combined signal on the response bus 118 by using output terminal 118-O.

In the shown example, circuit 140 includes a multiplexer 142, two AND gates 144 and 146, and two inverters 145 and 147. Multiplexer 142 is a circuit or a device that can be used to select one out of several input signals based on a control signal and route the selected input signal to an output. Each one of AND gates 144 and 146 is a circuit or a device that performs a logical conjunction operation. Each one of inverters 145 and 147 is a circuit or a device that performs a logical operation on its input signal and produces the logical complement (inverse) of the input at its output. As shown, an input terminal of inverter 145 is coupled to an output terminal of AND gate 144, and an output terminal of inverter 145 is coupled to an input terminal of multiplexer 142. An input terminal of AND gate 146 is coupled to an output terminal of inverter 147, and an output terminal of AND gate 146 is coupled to an input terminal of multiplexer 142.

In the shown example, multiplexer 142 can be configured to select, based on a control signal, one of two input signals including a first input signal that is received as an output signal of inverter 145 and a second input signal that is received as an output signal of AND gate 146, and transmit the selected input signal on the response bus 118.

IC chip 100 further includes a circuit 150 for processing signals on the command bus 116. Circuit 150 is configured to receive an input signal on the command bus 116 using input terminal 116-I, invert the input signal to generate an inverted signal, and transmit the inverted signal as an output signal on the command bus 116 using output terminal 116-O. In some implementations, circuit 150 is further configured to conditionally forward the input signal or the inverted signal to controller 120 based on a control signal received by circuit 150.

In the shown example, circuit 150 includes an inverter 152 and a multiplexer 154. An input terminal of inverter 152 is coupled to input terminal 116-I on the command bus 116, and an output terminal of inverter 152 is coupled to output terminal 116-O on the command bus 116. Furthermore, the input terminal of inverter 152 is further coupled to a first input terminal of multiplexer 154, and the output terminal of inverter 152 is further coupled to a second input terminal of multiplexer 154.

In some examples, inverter 152 can be configured to invert an input signal received on the command bus 116 to generate an inverted signal. In some examples, multiplexer 154 can be configured to select, based on a control signal, one of two input signals including a first input signal that is received as the input signal of inverter 152 and a second input signal that is received as the inverted signal of inverter 152, and transmit the selected input signal to controller 120.

Controller 120 of IC chip 100 is configured to manage and coordinate operations of various components within in IC chip 100. Controller 120 serves as an interface between hash engines 130 and other circuits or components of IC chip 100. Controller 120 can be configured to receive an input signal from circuit 150, and transmit an output signal to circuit 140. In some examples, controller 120 can be communicatively coupled to hash engines 130, and can obtain computation results from hash engines 130.

IC chip 100 further includes one or more hash engines 130. Each of the hash engines 130 includes hardware components configured to perform cryptographic hash computations. Hash engines 130 can perform the cryptographic hash computations using hash function algorithms such as SHA-1, SHA-256, or MD5, etc.

An example operating process of IC chip 100 includes receiving an input signal by IC chip 100 at input terminal 116-I on the command bus 116. In some examples, the input signal can be received from an upstream neighboring IC chip that is series connected to IC chip 100. IC chip 100 performs an inverting operation on the input signal by using inverter 152 to generate an inverted signal, and transmits the inverted signal on the command bus 116. In some examples, the inverted signal can be transmitted on the command bus 116 to a downstream neighboring IC chip that is series connected to IC chip 100. IC chip 100 can further conditionally forward the input signal or the inverted signal to controller 120 based on an odd or even configuration of IC chip 100 in an ordered arrangement of multiple IC chips including the upstream neighboring IC chip, IC chip 100, and the downstream neighboring IC chip. In some examples, when IC chip 100 is an even chip on the command bus 116, circuit 150 can be instructed to forward the input signal to controller 120. When IC chip 100 is an odd chip on the command bus 116, circuit 150 can be instructed to forward the inverted signal to controller 120.

After receiving a signal from circuit 150, controller 120 can instruct the hash engines 130 to perform cryptographs hash computations. Hash engines 130 can return a computation result to controller 120.

Another example operating process of IC chip 100 includes receiving an input signal by IC chip 100 at input terminal 118-I on the response bus 118. The input signal can be received from an upstream neighboring IC chip that is series connected to IC chip 100. IC chip 100 can combine the input signal and a signal produced by controller 120 by using circuit 140 to generate a combined signal, and transmit the combined signal as an output signal on the response bus 118. IC chip 100 can combine the input signal and the signal produced by controller 120 based on an even or odd configuration of IC chip 100. When IC chip 100 is an even chip on the response bus 118, IC chip 100 can combine the input signal and the signal produced by controller 120 by using AND gate 144 to generate a combined signal, and invert the combined signal by using inverter 145 to generate an inverted signal as an output signal on the response bus 118. When IC chip 100 is an odd chip on the response bus 118, IC chip 100 can invert the input signal by using inverter 147 to generate an inverted signal, and combine the inverted signal and the signal produced by controller by using AND gate 146 to generate a combined signal as an output signal on the response bus 118. The output signal of IC chip 100 on the response bus 118 can be transmitted to a downstream neighboring IC chip that is series connected to IC chip 100.

Figure 3:
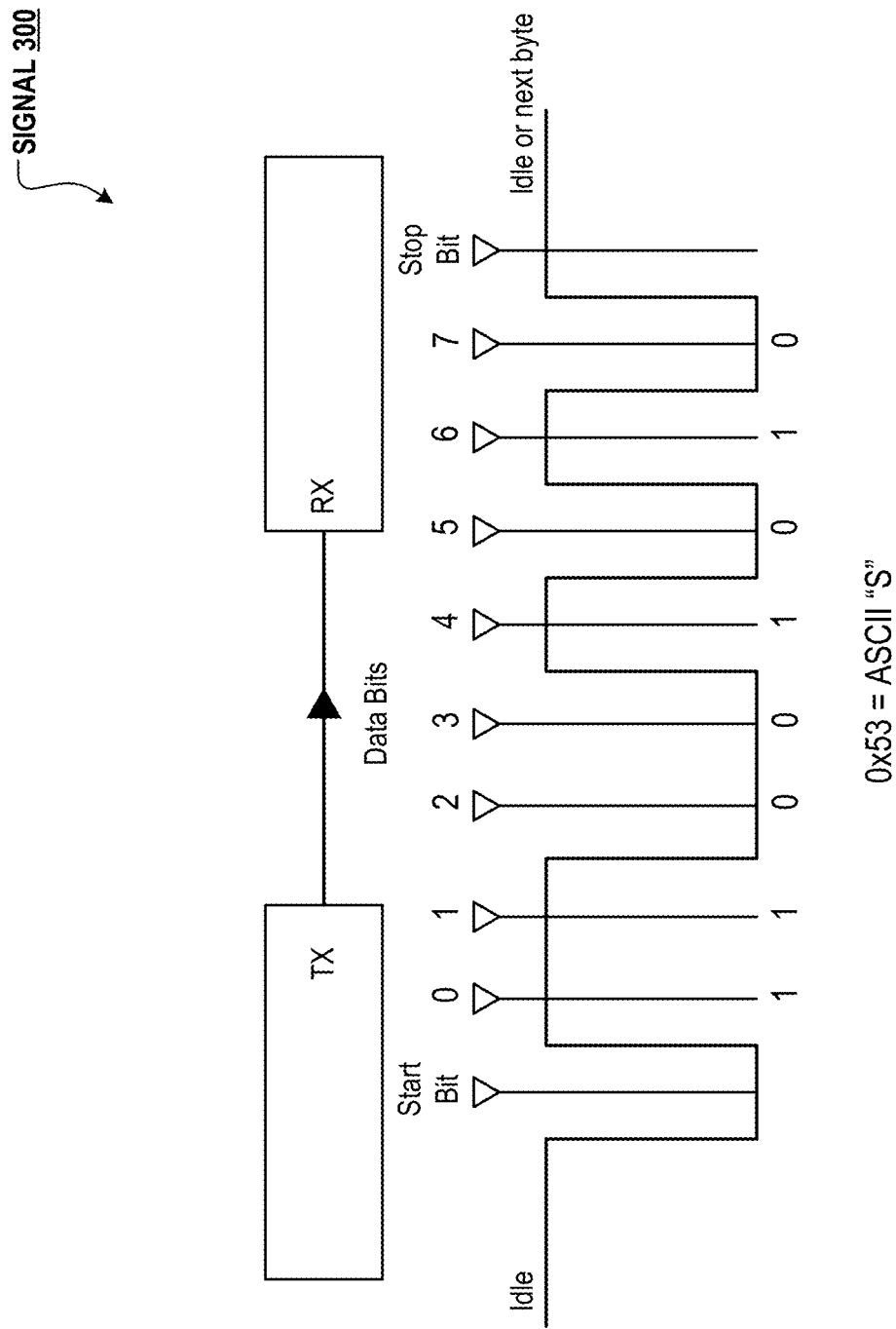
FIG. 3 shows a format of an example signal.

The signal produced by controller 120 can be generated based on one or more computation results from hash engines 130. The signal produced by controller 120 can be an idle signal. In some examples, the signal produced by controller 120 has a format as shown in FIG. 3. Referring to FIG. 3, a format of an example signal 300 includes ten bits, where the start bit of signal 300 indicates a logic low state (e.g., "0"), and the stop bit of signal 300 indicates a logic high state (e.g., "1"). The eight bits between the start bit and the stop bit are data bits. An idle signal is a series of bits in a known pattern, e.g., ten bits of "1"s. Continuing with the examples with reference to FIG. 2, the data bits of signal 300 can include or indicate the computation results from hash engines 130. In the illustrated example of FIG. 3, the computation result output by an IC chip is shown to have a binary value of "01010011", which corresponds to a hex value of "0x53" and an ASCII symbol of "S".

By using the above combine-and-forward method, the output signal can be promptly transmitted without undergoing synchronization or retiming processes. By eliminating store-and-forward mechanism for data, an asset 10 minimizes delays typically incurred during those processes. The combining and forwarding of the signals enable swift transmission without latency-inducing operations. Each IC chip 100 includes components to invert communication signals at the IC chip 100. This deliberate inversion serves as a beneficial measure to prevent the accumulation of a specific class of noise. By inverting the signal at each IC chip 100, the noise that may have been introduced in previous stages of the asset 10 is counteracted, thus maintaining signal integrity. Each IC chip 100 possesses the ability to self-discover its position within the asset 10, allowing it to determine whether it has an odd or even configuration in an ordered arrangement of IC chips in the asset 10. This self-discovery enables an IC chip 100 to handle the inversion of the communication signals internally, ensuring that the overall asset 10 functions as intended.

Further examples of cryptomining assets and their operating principles are described in U.S. application Ser. No. 18/217,185, which is incorporated by reference herein in its entirety for all purposes.

Figure 4:
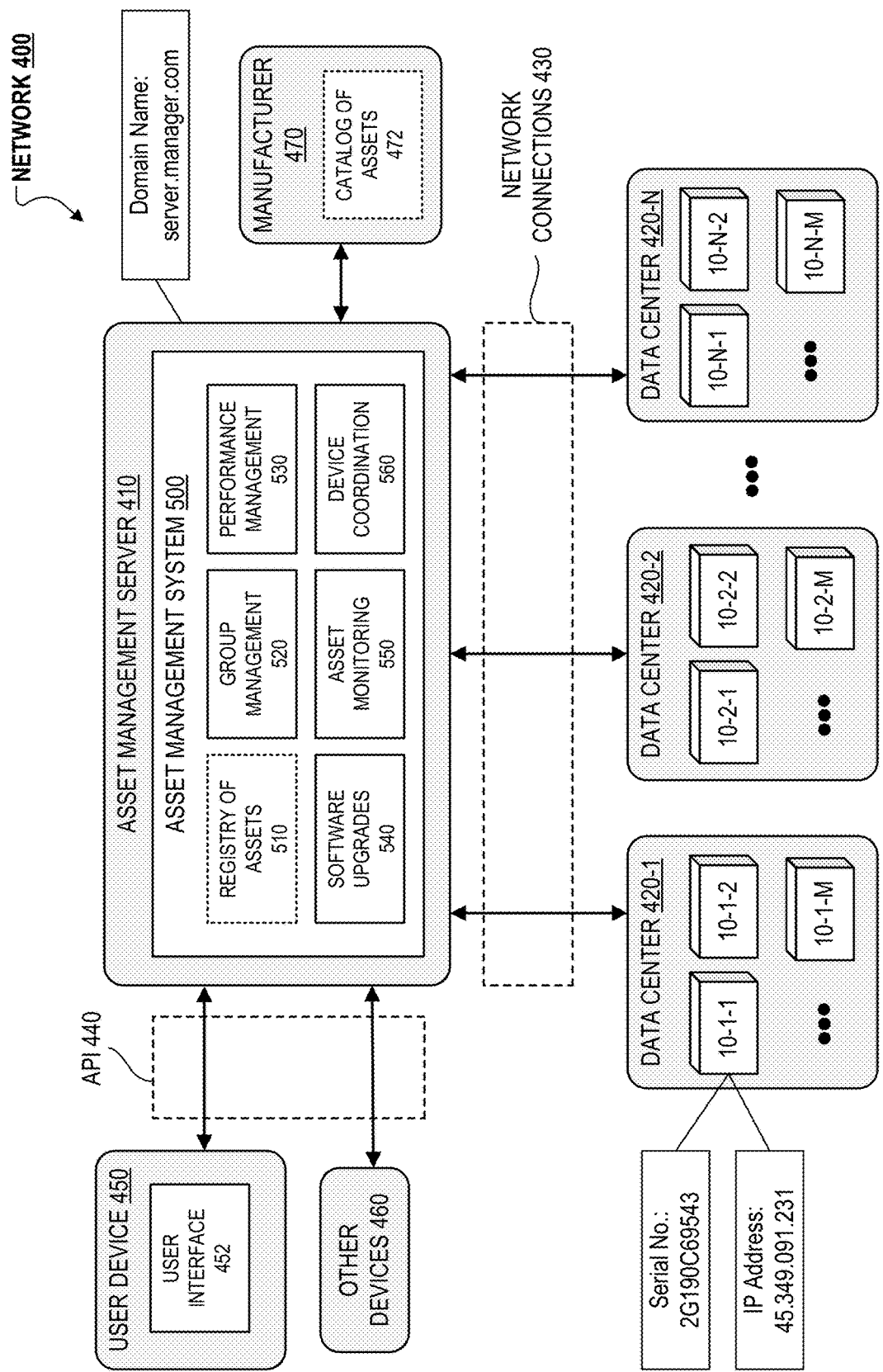
FIG. 4 shows a schematic diagram of an example cryptomining computer network including an asset management server and multiple cryptomining assets.

FIG. 4 shows a schematic diagram of an example cryptomining computer network 400 including an asset management server 410 and multiple cryptomining assets 10.

The asset management server 410, sometimes referred to as a Fleet Management Console (FMC), can be a dedicated hardware device or data center located in a "central" location for centralized control of the assets 10. Alternatively, the server 410 can be a cloud server dispersed over one or more data centers in one or more locations. In the example of FIG. 4, assets 10 are housed in multiple data centers 420-1 through 420-N. A first collection of assets 10-1-1 through 10-1-M are housed in a first data center 420-1, a second collection of assets 10-2-1 through 10-2-M are housed in a second data center 420-2, and so on. In general, the computer network 400 can include any number of assets 10, e.g., one thousand, ten thousand, one hundred thousand, one million, or more assets 10, housed in any number of data centers 420, e.g., one, two, five, ten, fifty, one hundred, or more data centers 420. The server 410 is configured to control each asset 10 in the network 400 such that each asset 10 performs a mining operation as directed by server 410. Various ways server 410 can manage and control the assets 10 are described in the following.

In this example, the computer network 400 is a wide area network (WAN) such that server 410 has a domain name (e.g., "server.manager.com") and each asset 10 has a respective unique identifier (UID) in the form of a serial number (e.g., "2G190C69543"). Each asset 10 also has a network (IP) address (e.g., "45.349.091.231") for communicating with the server 410 via network connections 430. For example, an administrator can assign the domain name to the server 410, and the server 410 can dynamically generate the network addresses of each asset 10 when they are connected to the network 400, e.g., using Dynamic Host Configuration Protocol (DHCP). Alternatively, a network provider can generate the network addresses of each asset 10 when they are connected to the network 400. Combinations of both the server 410 and the network provider generating network addresses for the assets 10 can also be implemented. For example, when the server 410 and one or more assets 10 are first installed, respective network addresses of the server 410 and one or more assets 10 can be assigned by the network provider. Thereafter, the server 410 can handle generation of the network addresses for new assets 10 that are connected to the computer network 400.

The network connections 430 can be securely established and configured for bidirectional transmission of network messages using an appropriate communication protocol (see FIG. 5A for example), e.g., using WebSocket, HTTPS, or other protocols. The server 410 can communicate with user device(s) 450 and other devices 460 or platforms (e.g., other servers) via a secure Application Programming Interface (API) 440. For example, a user can provide user inputs to a user interface 452 (e.g., a web or mobile application) on user device 450 (e.g., a mobile, tablet, laptop, personal computer, or other device) to control any assets 10 that the user owns. The server 410 can also receive updates regarding what assets 10 have been manufactured and deployed from a manufacturer 470 (or other authority). For example, the manufacturer 470 can maintain a catalog of assets 472 that includes the respective UID of each asset 10 in circulation. Server 410 can cross-index the catalog 472 when an asset 10 is onboarded to network 400 to validate that the asset 10 is associated with the server 410 and network 400.

As shown in FIG. 4, an asset management system 500 is implemented on the server 410 as computer programs to perform the various functions of the server 410. In this example, the asset management system 500 includes: a registry of assets 510, a group management subsystem 520, a performance management subsystem 530, a software upgrade subsystem 540, an asset monitoring and reporting subsystem 550, and a device coordination subsystem 560. Note that the registry and subsystems 510-560 are shown as individual components of asset management system 500 for ease of description and illustrative purposes only. Asset management system 500 can be configured to perform some or all of the functions of each subsystem 510-560.

Registry 510 includes the respective UID and network address of each asset 10 connected to the computer network 400. Server 410 can use the registry 510 to maintain an ongoing record of all the assets 10 in the network 400, e.g., when and how long each asset 10 has been active in the network 400, which assets 10 are available or unavailable, which assets 10 need maintenance or have gone out of service, etc.

Group management subsystem 520 allows the server 410 to perform multiple functions related to grouping of assets 10, including one or more of the following. Server 410 can automatically group multiple assets 10 automatically accordingly to one or more common features of the assets 10. For example, the server 410 can group multiple assets 10 into a group of assets according to a common geolocation of the assets 10, common hardware specifications among the assets 10, a common owner of the assets 10, etc. The server 410 may also receive user inputs through user interface 452 corresponding to a manual selection of multiple assets 10 that are to be grouped together into a group of assets. Server 410 can also control a group's visibility and accessibility to user devices 450 or other devices 460 (e.g., other servers). Server 410 can control the operation details of groups of assets, both at a high level (e.g., by targeting a total net hash rate of an entire group of assets performing a mining operation) and at a low level (e.g., by targeting a respective hash rate for each asset in the group).

Performance management subsystem 530 allows server 410 to perform functions relating to asset 10 configuration, including one or more of the following. The server 410 can configure the energy tune of an asset 10, e.g., automatically (or manually via user inputs through user interface 452) increasing or decreasing the power consumption of the asset 10. The server 410 can configure power consumption constraints of an asset 10, e.g., a bound between a maximum power consumption and/or a minimum power consumption for the asset 10 to operate at. For example, the server 410 can specify power consumption constraints based on the hardware specification of an asset 10, constraints of a service provider servicing the asset 10, and/or constraints of the data center 420 that the asset 10 may be housed in. The server 410 can ramp up and/or down one or multiple assets 10 under any critical conditions such as power surges. For example, the server 410 can receive periodic updates from a server provider managing power to and from a data center 420 and a grid. The server 410 can then ramp up and/or down a group of assets housed in the data center 420 to coordinate with expected (or unexpected) power interruptions. The server 410 can further perform pool configuring for one or more pools of assets, e.g., pooling network connections of assets using a pooling server and pushing a common set of pool configurations to an asset pool, e.g., for performing a certain mining operation. Further details related to pooling servers and asset pools is described below with respect to FIG. 5B.

Software upgrade subsystem 540 allows server 410 to perform functions relating to asset 10 software upgrading and network configuring, including one or more of the following. Server 410 can transmit hash rate settings (e.g., TeraHashRates) to an individual asset 10, all assets 10, or selected groups of assets. The hash rate settings can include target hash rates that maximize a rate of return (e.g., expected USD per second) for the individual asset 10, all assets 10, or the selected groups of assets 10 that are performing a cryptocurrency mining operation for a cryptocurrency. For example, the server 410 can retrieve an energy rate (e.g., measured in USD per kilowatt-hour) from a service provider servicing a particular data center 420. The server 410 can also retrieve parameters of the cryptocurrency from a market of the cryptocurrency, such as a current price, difficulty, and block subsidy of the cryptocurrency. The server 410 can then determine the hash rate settings from the energy rate and cryptocurrency parameters, e.g., using an optimization technique, that optimizes the rate of return. Server 410 can send software and/or firmware upgrades to an individual asset 10, all assets 10, or selected groups of assets, e.g., to fix bugs and improve features of custom software and/or the operating system running on the asset(s) 10. Further, server 410 can transmit network configurations (e.g., using DHCP) for the network connections 430, e.g., WebSocket or HTTPS parameter configurations, to an individual asset 10, all assets 10, or selected groups of assets 10.

Asset monitoring and reporting subsystem 550 allows server 410 to perform functions relating to health status monitoring of any and all assets 10, including one or more of the following. Server 410 can track health status information of each asset 10 while the asset 10 is in operation, such as contemporaneous, or near-contemporaneous health status tracking. For example, the health status information can include a temperature of the asset 10, a memory usage of the asset 10, cache hit metrics of the asset 10, or any other performance or health metrics of the asset 10 while it is in operation. Server 410 can also record any alerts signaling faults and/or failures of each asset 10 while the asset 10 is performing a mining operation. For example, server 410 can record static or dynamic faults corresponding to incorrect bit values when the asset 10 is performing the mining operation. Server 410 can then generate standard formatted reports (e.g., PDF, CSV, or other formats) that includes the health status information of an asset 10 (or multiple assets) over a specific timeframe. Server 410 can forward the reports to a user (e.g., an owner of the asset(s) 10) and/or an administer of the server 410 for analysis and/or investigation.

Device coordination subsystem 560 allows server 410 to perform functions relating to coordination of user devices 452 and other devices 460 via the secured API 440. For example, the server 410 can share the asset management information (e.g., health status information of a user's assets) generated and/or recorded by the server 410 with the user devices 452 and other devices 460 via the API 440. Examples of other devices 460 may include other platforms (e.g., other computers or network devices), other servers (e.g., cloud servers), etc.

Figure 5A:
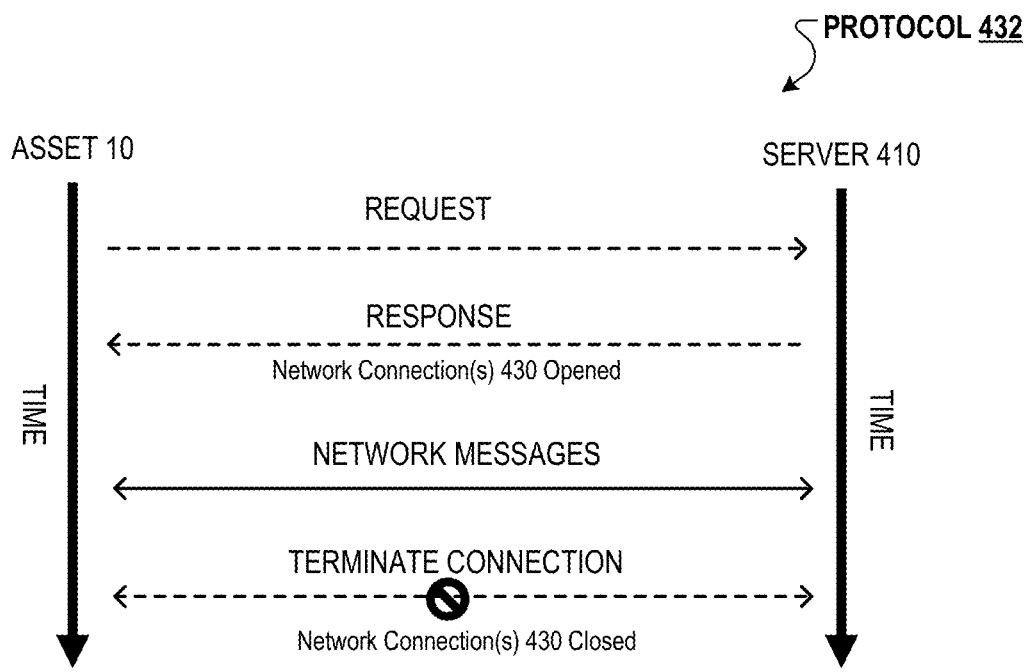
FIG. 5A shows a diagram of an example process for establishing a network connection between an asset management server and a cryptomining asset.

FIG. 5A shows a diagram of an example communication protocol 432 for establishing a network connection 430 between the asset management server 410 and a cryptomining asset 10 in the computer network 400. For example, the protocol 432 can be a WebSocket or HTTPS protocol that can be used to establish a Transmission Control Protocol (TCP) connection with full-duplex communication, e.g., bidirectional network messages.

To establish the network connection 430, the protocol 432 begins with a handshaking protocol, e.g., HTTP. The asset 10 first issues a handshake request to the server 410. For example, the handshake request can include the domain name of the server 410, a hash key, and a network address of the asset 10 (e.g., generated by the server 410 or a network provider). If the server 410 accepts the handshake request (e.g., based on the network address of the asset 10), the server 410 issues a handshake response to the asset 10 which upgrades the handshaking protocol to a bidirectional protocol (e.g., TCP), establishing the network connection 430. For example, the handshake response can include a hash value generated by the server 410 by hashing the hash key, and an upgrade prompt (e.g., an HTTP upgrade header). The asset 10 and server 410 can then communicate securely with each other via network messages over the network connection 430. In general, either the asset 10 or the server 410 can terminate the network connection 430 after it is established.

Figure 5B:
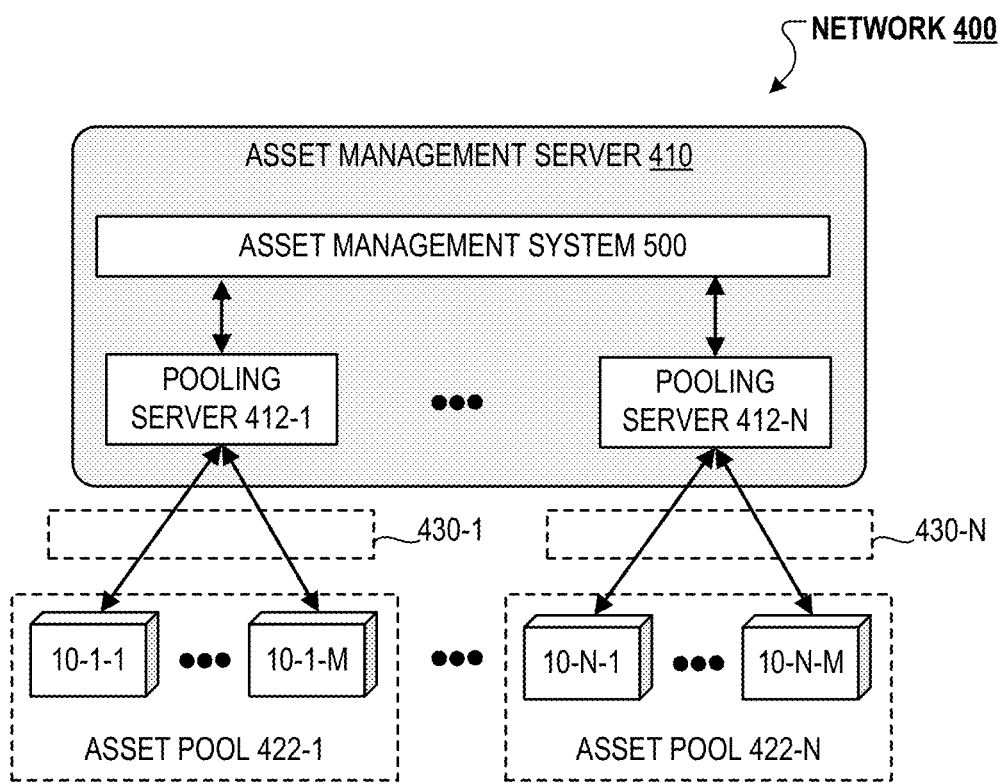
FIG. 5B shows a schematic diagram of an asset management server including multiple pooling servers for pooling network connections for multiple pools of assets.

FIG. 5B shows a schematic diagram of the asset management server 410 including multiple pooling servers 412-1 through 412-N. Each pooling server 412-1 through 412-N pools network connections 430-1 through 430-N for respective pools of assets 422-1 through 422-N. Each asset pool 422 includes a respective group of one or more assets 10-1 through 10-M. Pooling servers 412 can be configured as proxy servers (e.g., having respective server names and network addresses) or general connection poolers depending on the implementation. The server 410 can use pooling servers 412 to reduce the cost of continuously opening and closing network connections 430 by maintaining a "pool" of open connections that can be reused by assets 10 in a particular asset pool 422. Hence, the server 410 can streamline the onboarding, offboarding, and configuration of multiple assets 10 in an asset pool 422.

For example, a network connection 430 between an asset 10 and the server 410 can be established using a pooling server 412 as follows.

The asset 10 issues a request to establish a network connection with the server 410. The server 410 can handle the request directly (e.g., using protocol 432) or assign the asset 10 to an asset pool 422 such that the request is handled by the corresponding pooling server 412. For example, server 410 can use information such as the geolocation of the asset 10, the serial number of the asset 10, the network address of the asset 10, or the operating system of the asset 10 to assign the asset 10 to the particular asset pool 422. Hence, assets 10-1 to 10-M that belong to the same asset pool 422 may belong in the same or different data centers 420 depending on how they are assigned.

If the asset 10 is assigned to the asset pool 422, the pooling server 412 receives the request from the asset 10 and checks for an existing and available cached network connection for the asset 10. If the pooling server 412 finds a cached network connection, it is returned to the asset 10. If the pooling server 412 does not find a cached network connection, pooling server 412 establishes a new network connection (e.g., using protocol 432), as long as no pooling settings of the pooling server 412 are violated. Pooling settings can include, but are not limited to, a maximum asset pool size, a maximum number of connections allowed, and so on. If creating a new network connection 430 violates any of such pooling settings, the request is queued by the pooling server 412 until a network connection is available or a new network connection can be created.

Upon establishing the network connection 430, the asset 10 can then be validated and registered by the server 410 and subsequently receive a set of pool configurations that is broadcast to all assets 10-1 through 10-M in the asset pool 422. The asset management server 410 can periodically broadcast pool configurations to all assets 10-1 through 10-M belonging to the asset pool 422 such that all assets 10-1 through 10-M in the pool 422 are in sync with the latest pool configurations.

The asset management server 410 can maintain a list of pooling servers 412 that includes their respective server names, network addresses, and sets of pool configurations. The asset management server 410 can further poll each pooling server 412 to check the status and/or receive periodic status updates from the pooling servers 412. If a pooling server 412 becomes unavailable (e.g., loses network connection), the asset management server 410 can automatically select (e.g., based on network latency, congestion, server load, task priority, or user's setting) a backup pooling server 412. The asset management server 410 can then transfer all assets 10 belonging to the unavailable pool server to the backup pooling server. For example, the asset management server 410 can broadcast a network message to all affected assets to instruct those affected assets to use the pool configurations of the backup pooling server. A user of the asset management server 410 can define their own pool configurations and upload the pool configurations to the asset management server 410, e.g., via the user interface 452. Alternatively, or in addition, the server 410 can maintain default pool configurations (e.g., programmed by an administrator of the server 410) that are made available to any new assets.

Figure 6:
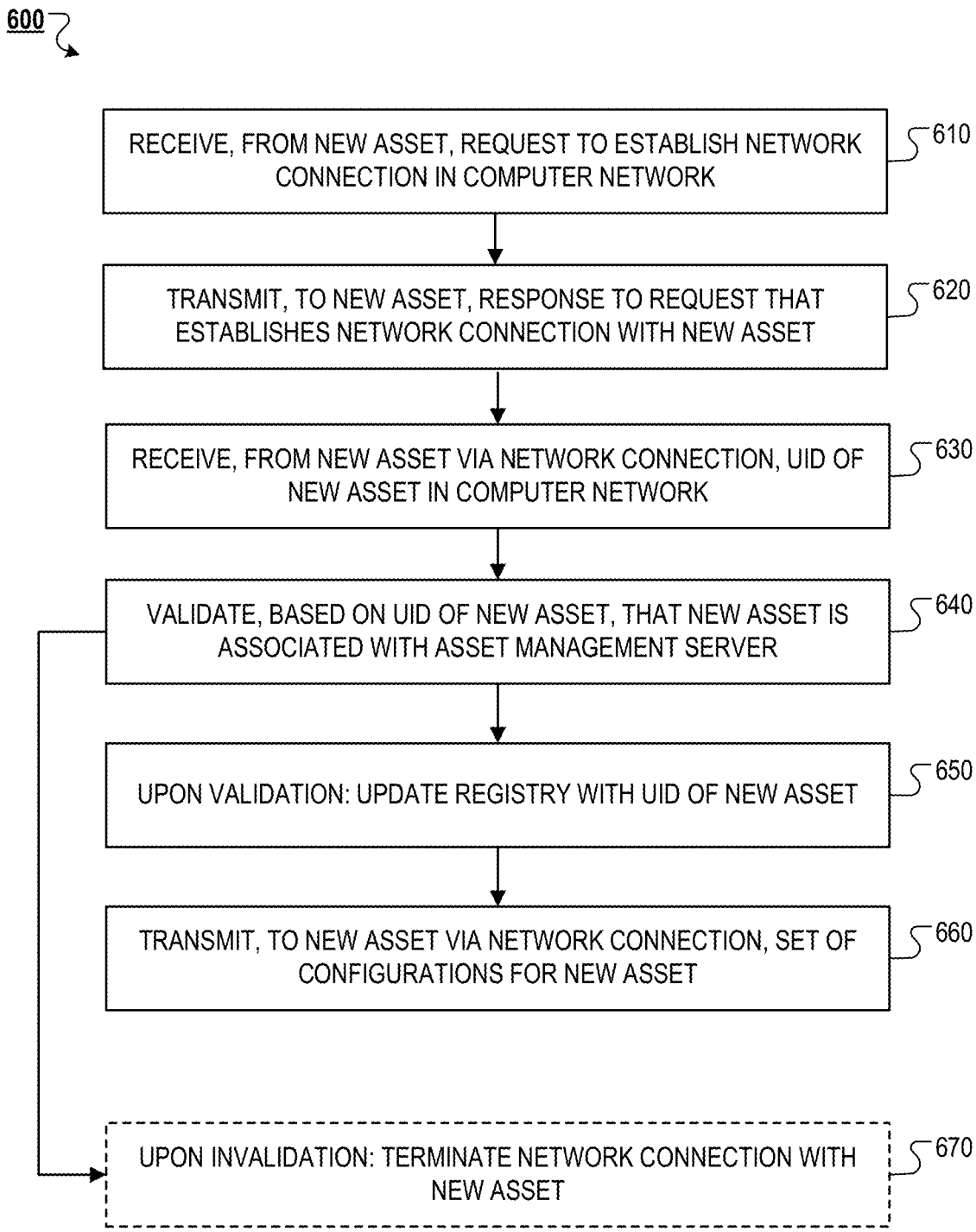
FIG. 6 shows a flow chart of an example process performed by an asset management server for zero-touch provisioning (ZTP) of a new cryptomining asset.

FIG. 6 shows a flow chart of an example process 600 for zero-touch provisioning (ZTP) of a new cryptomining asset in a cryptomining computer network. For example, the new asset can be configured according to FIGS. 1A-1C or otherwise appropriate for performing a mining operation. For convenience, the process 600 will be described as being performed by an asset management server for the computer network, e.g., the asset management server 410 of FIG. 4.

Server receives, from the new asset, a request to establish a network connection in the computer network (610).

For example, the request can be a handshake request that includes: (i) a domain name of the server, (ii) a hash key, and (iii) a network address (e.g., IP address) for the new asset.

Server transmits, to the new asset, a response to the request that establishes the network connection with the new asset (620).

For example, the server can accept the request to establish the network connection, e.g., based on the network address for the new asset. The response can be a handshake response that includes: (i) a hash value generated by the server by hashing the hash key, and (ii) an upgrade prompt that upgrades the handshaking protocol to the network connection.

Server receives, from the new asset via the network connection, a unique identifier (UID) of the new asset in the computer network (630).

In some cases, the unique identifier of the new asset is a serial number of the new asset. The server can also generate the network address for the new asset when establishing the network connection with the new asset, e.g., using DHCP.

Server validates, based on the unique identifier of the new asset, that the new asset is associated with the server (640).

For example, the server can obtain a catalog that includes a respective unique identifier of each asset associated with the server. The server can then determine that the unique identifier of the computer is amongst the unique identifiers in the catalog. The server may obtain the catalog from a manufacturer of each asset associated with the server.

Upon validation that the new asset is associated with the server:

Server updates a registry with the unique identifier of the new asset (650). The registry includes the respective unique identifier (e.g., serial number) of each asset associated with the server that is connected to the computer network. The server can also update the registry with the network address for the new asset. The registry can also be associated with a unique identifier and/or network address for the server, such as a domain name or hostname of the server.

Server transmits, to the new asset via the network connection, a set of configurations for the new asset (660). The set of configurations includes a software configuration that configures the new asset to perform a mining operation. For example, the mining operation can be a cryptocurrency mining operation for a cryptocurrency (e.g., BITCOIN). Examples of mining operations that can be performed by the new asset are described in detail with respect to FIGS. 1A-3.

In some implementations, the server includes (or instantiates) one or more pooling servers to handle the network connection request of the new asset, as well as multiple other assets that are being onboarded sequentially or in parallel with the new asset. Particularly, the server can assign the new asset to a pool of assets that are pooling network connections via a particular pooling server (e.g., a proxy server or connection pooler). In this case, the network connection with the new asset can be established between the pooling server, e.g., using an existing cashed network connection, creating a new network connection, or queuing until a network connection becomes available or a new network connection can be created. The set of configurations for the new asset are then a set of pool configurations. The set of pool configurations commonly configure each asset in the asset pool that are connected to the computer network via the pooling server.

In some implementations, the set of configurations for the new asset can further include a network configuration that configures the network connection with the new asset, e.g., WebSocket or HTTPS parameters.

In some implementations, the set of configurations for the new asset can further include an operating configuration that configures operating parameters of the new asset while performing the mining operation. The operating parameters can include one or more of: a maximum power consumption, a minimum power consumption, or a target hash rate of the new asset while performing the mining operation. For example, a service provider servicing the new asset in a data center, or the data center itself, may have a maximum power that can be drawn from a power supply. The service provider (or data center) may send alerts to the server and/or shut off power if this maximum power draw is breached. Hence, the server can provide this power constraint to the new asset to stay within this maximum bound to ensure the new asset operates continuously. The server may also specify a minimum power bound for the new asset such that it idles, stays in "sleep mode", or is at least performing a "break even" mining operation, e.g., so that any performance loss from ramping the new asset up and down is minimized. The target hash rate can be provided to the new asset to optimize performance of the new asset while performing the mining operation. For example, in situations when the new asset performs a cryptocurrency mining operation for a cryptocurrency, the server may use optimization techniques to determine the target hash rate that maximizes a rate of return (e.g., an expected USD per second) for the cryptocurrency mining operation. To do so, the server can retrieve, e.g., from the service provider, an energy rate while the new asset is performing the cryptocurrency mining operation. The energy rate can be measured as the price (e.g., USD) of electricity per kilowatt-hour (kWh) provided by the service provider at any point in time. The server can then retrieve, e.g., from a market of the cryptocurrency, parameters of the cryptocurrency while the new asset is performing the cryptocurrency mining operation. The parameters of the cryptocurrency can include one or more of: a price, a difficulty, or a block subsidy of the cryptocurrency while the new asset is performing the cryptocurrency mining operation. The server can then determine, from the energy rate and the parameters of the cryptocurrency, the target hash rate that maximizes the rate of return for the cryptocurrency mining operation.

In some implementations, the server can also transmit, to the new asset via the network connection, a software (e.g., firmware) update that updates the software configuration for the computer. For example, the server can deploy bug fixes or improvements to the software and/or operating system implemented on the new asset using the software update.

In some implementations, the server can also group, e.g., automatically, the new asset with one or more other assets associated with the server (that are connected to the computer network) into a group of assets, e.g., according to common features of the new asset the one or more other assets. For example, the common features can include one or more of: a common geolocation, a common hardware specification, or a common owner of each asset in the group of assets. The group of assets can also be grouped manually, e.g., by a user through a user interface (e.g., via secured API), or an administrator of the server. The group of assets can be configured according to a (common) set of group configurations including one or more of: a common software configuration, a common network configuration, or a common operating configuration, that configures each asset in the group of assets. The server can then transmit, to the new asset via the network connection, the set of group configurations that configures one or more of: the software parameters, network parameters, or operating parameters of the new asset.

In some implementations, the server may also monitor (e.g., contemporaneously, or near-contemporaneously) health status information of the new asset while performing the mining operation. For example, the health status information can include one or more of: any faults or failures of the new asset, a temperature of the new asset, or a memory usage of the new asset while performing the mining operation. The server can then generate a report (e.g., in PDF, CSV, or other appropriate format) that includes the health status information of the new asset and thereafter provide the report to a user or an administrator of the server, e.g., for analysis and/or investigation.

Alternatively, upon invalidation that the new asset is associated with the server:

Server terminates the network connection with the new asset (670).

It is to be noted that although process steps, method steps, algorithms or the like may be described in a sequential order above, such processes, methods and algorithms may generally be configured to work in alternate orders, unless specifically stated to the contrary.

The processes and logic flows described in this document can be performed by one or more programmable processors executing one or more computer programs to perform the functions described herein. The processes and logic flows can also be performed by, and apparatus can also be implemented as, special purpose logic circuitry, for example, an FPGA (field-programmable gate array) or an ASIC (application-specific integrated circuit).

Processors suitable for the execution of a computer program include, by way of example, both general and special purpose microprocessors, and any one or more processors of any kind of digital computer. Computer readable media suitable for storing computer program instructions and data can include all forms of nonvolatile memory, media and memory devices. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method performed by an asset management server for a computer network, the method comprising:
    receiving, from a computer, a request to establish a network connection in the computer network;
    transmitting, to the computer, a response to the request that establishes the network connection with the computer;
    receiving, from the computer via the network connection, a unique identifier of the computer in the computer network;
    determining, based on the unique identifier of the computer, whether the computer is an asset associated with the asset management server; and
    upon determining that the computer is an asset associated with the asset management server:
        transmitting, to the computer via the network connection, a set of configurations for the computer,
        wherein the set of configurations comprises a software configuration that configures the computer to perform a mining operation.

2. The method of claim 1, wherein determining, based on the unique identifier of the computer, whether the computer is an asset associated with the asset management server comprises:

obtaining a catalog comprising a respective unique identifier of each asset associated with the asset management server; and determining whether the unique identifier of the computer is amongst the unique identifiers in the catalog.

3. The method of claim 2, wherein the catalog is obtained from a manufacturer of each asset associated with the asset management server.

4. The method of claim 1, further comprising, upon determining that the computer is an asset associated with the asset management server updating, with the unique identifier of the computer, a registry comprising a respective unique identifier of each asset associated with the asset management server that is connected to the computer network.

5. The method of claim 4, wherein the unique identifier of the computer is a serial number of the computer.

6. The method of claim 5, further comprising:

generating a network address for the computer when establishing the network connection with the computer; and upon determining that the computer is an asset associated with the asset management server:

updating the registry with the network address for the computer.

7. The method of claim 1, further comprising, upon determining that the computer is not an asset associated with the asset management server:

terminating the network connection with the computer.

8. The method of claim 1, further comprising, upon determining that the computer is an asset associated with the asset management server:

monitoring health status information of the computer while performing the mining operation;

generating a report comprising the health status information of the computer; and providing the report to an administrator of the asset management server.

9. The method of claim 8, wherein the health status information of the computer comprises one or more of:

any faults or failures of the computer while performing the mining operation;

a temperature of the computer while performing the mining operation; or a memory usage of the computer while performing the mining operation.

10. The method of claim 1, wherein the set of configurations further comprises:

a network configuration that configures the network connection with the computer.

11. The method of claim 1, further comprising, upon determining that the computer is an asset associated with the asset management server:

transmitting, to the computer via the network connection, a software update that updates the software configuration for the computer.

12. The method of claim 1, wherein:

the network connection with the computer is established via a pooling server, and the set of configurations for the computer is a set of pool configurations for each asset associated with the asset management server that is connected to the computer network via the pooling server.

13. The method of claim 1, wherein the set of configurations further comprises:

an operating configuration that configures operating parameters of the computer while performing the mining operation.

14. The method of claim 13, wherein the operating parameters of the computer comprise one or more of:

a maximum power consumption of the computer while performing the mining operation;

a minimum power consumption of the computer while performing the mining operation; or a target hash rate of the computer while performing the mining operation.

15. The method of claim 14, wherein the mining operation is a cryptocurrency mining operation for a cryptocurrency.

16. The method of claim 15, further comprising, upon determining that the computer is an asset associated with the asset management server:

retrieving, from a service provider servicing the computer, an energy rate while the computer is performing the cryptocurrency mining operation;

retrieving, from a market of the cryptocurrency, parameters of the cryptocurrency while the computer is performing the cryptocurrency mining operation; and determining, from the energy rate and the parameters of the cryptocurrency, the target hash rate that maximizes a rate of return for the cryptocurrency mining operation.

17. The method of claim 16, wherein the parameters of the cryptocurrency comprise one or more of:

a price of the cryptocurrency while the computer is performing the cryptocurrency mining operation;

a difficulty of the cryptocurrency while the computer is performing the cryptocurrency mining operation; or a block subsidy of the cryptocurrency while the computer is performing the cryptocurrency mining operation.

18. The method of claim 1, further comprising, upon determining that the computer is an asset associated with the asset management server:

grouping, based on common features of the computer and one or more other assets associated with the asset management server that are connected to the computer network, the computer and the one or more other assets into a group of assets; and transmitting, to the computer via the network connection, a set of group configurations for each asset in the group of assets.

19. The method of claim 18, wherein the common features comprise one or more of:

a common geolocation of each asset in the group of assets;

a common hardware specification of each asset in the group of assets; or a common owner of each asset in the group of assets.

20. The method of claim 1, wherein the computer comprises:

a plurality of integrated circuit (IC) chips that are series connected using a plurality of buses; and a central processing unit (CPU) that is configured to transmit control instructions to the IC chips on one or more of the buses.

21. An asset management server system comprising one or more first computers and one or more storage devices communicatively coupled to the one or more first computers, wherein the one or more storage devices store instructions that, when executed by the one or more first computers, cause the one or more first computers to perform operations comprising:

receiving, from a second computer, a request to establish a network connection in a computer network;

transmitting, to the second computer, a response to the request that establishes the network connection with the second computer;

receiving, from the second computer via the network connection, a unique identifier of the second computer in the computer network;

determining, based on the unique identifier of the second computer, whether the second computer is an asset associated with the asset management server system for the computer network; and upon determining that the second computer is an asset associated with the asset management server system:

transmitting, to the second computer via the network connection, a set of configurations for the second computer, wherein the set of configurations comprises a software configuration that configures the second computer to perform a mining operation.

22. One or more non-transitory computer storage media storing instructions that, when executed by an asset management server system comprising one or more first computers, cause the one or more first computers to perform operations comprising:

receiving, from a second computer, a request to establish a network connection in a computer network;

transmitting, to the second computer, a response to the request that establishes the network connection with the second computer;

receiving, from the second computer via the network connection, a unique identifier of the second computer in the computer network;

determining, based on the unique identifier of the second computer, whether the second computer is an asset associated with the asset management server system for the computer network; and upon determining that the second computer is an asset associated with the asset management server system:

transmitting, to the second computer via the network connection, a set of configurations for the second computer, wherein the set of configurations comprises a software configuration that configures the second computer to perform a mining operation.

23. The one or more non-transitory computer storage media of claim 22, wherein the asset management server system comprises the one or more non-transitory computer storage media.

\* \* \* \* \*